(12) United States Patent
Dawson et al.

(10) Patent No.: US 6,465,121 B1
(45) Date of Patent: Oct. 15, 2002

(54) METHOD FOR DISTRIBUTING ELECTROLYTE IN BATTERIES

(76) Inventors: Lev M. Dawson, 301 Conestoga Way, Henderson, NV (US) 89015; Tracy E. Kelley, 625 N. Whitney Ranch Dr., #1126, Henderson, NV (US) 89014; Oliver J. Gross, 301 Conestoga Way, Henderson, NV (US) 89015; Robert J. Horning, 960 Eagle Mountain Dr., Las Vegas, NV (US) 89123; Porter H. Mitchell, 9033 Cotton Rose La., Las Vegas, NV (US) 89128

(*) Notice: Subject to any disclaimer, the term of this patent is extended or adjusted under 35 U.S.C. 154(b) by 72 days.

(21) Appl. No.: 09/652,249

(22) Filed: Aug. 30, 2000

(51) Int. Cl.[7] .................................................. H01M 2/38
(52) U.S. Cl. .............................. 429/51; 429/52; 429/72
(58) Field of Search .............................. 429/72, 81, 71, 429/51, 52

(56) References Cited

U.S. PATENT DOCUMENTS

| | | | |
|---|---|---|---|
| 4,115,630 A | * | 9/1978 | Van Ommering et al. .... 429/72 |
| 4,783,382 A | * | 11/1988 | Benedick et al. ............. 429/52 |
| 4,997,732 A | | 3/1991 | Austin et al. |
| 5,326,653 A | | 7/1994 | Chang |
| 5,445,856 A | | 8/1995 | Chaloner-Gill |
| 5,456,000 A | | 10/1995 | Gozdz et al. |
| 5,460,904 A | | 10/1995 | Gozdz et al. |
| 5,615,717 A | | 4/1997 | Cheiky |
| 5,670,273 A | | 9/1997 | Velasquez et al. |
| 5,738,691 A | | 4/1998 | Barker et al. |
| 5,746,781 A | | 5/1998 | Velasquez et al. |
| 5,759,215 A | | 6/1998 | Masuda |
| 5,902,697 A | | 5/1999 | Guindy et al. |
| 6,063,519 A | | 5/2000 | Barker et al. |

* cited by examiner

*Primary Examiner*—John S. Maples
(74) *Attorney, Agent, or Firm*—Roger A. Williams; Cynthia Kovacevic

(57) ABSTRACT

A method for activating electrochemical cells including the steps of sealing the electrochemical cells in a container with an activating electrolyte solvent and salt, treatment steps, such as the application of compression and decompression cycles to the container, for providing good distribution of the electrolyte within the electrochemical cells.

18 Claims, 2 Drawing Sheets

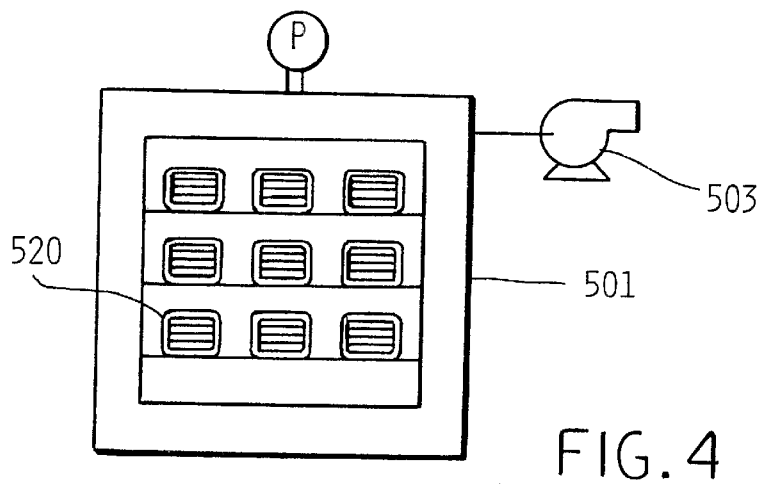
FIG. 4
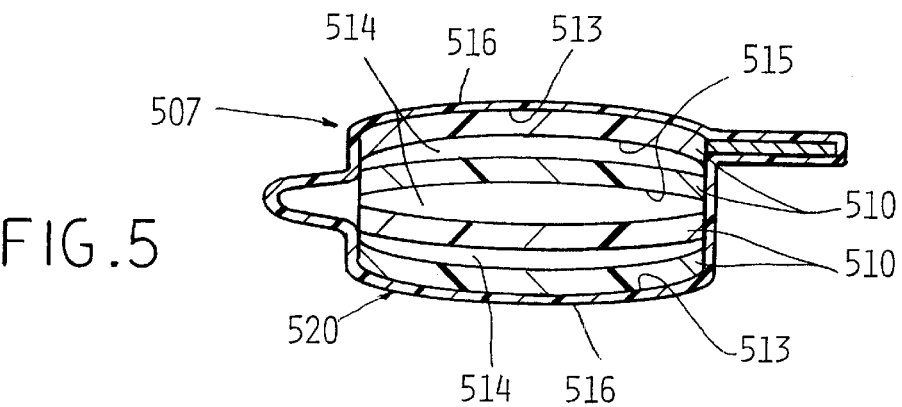
FIG. 5
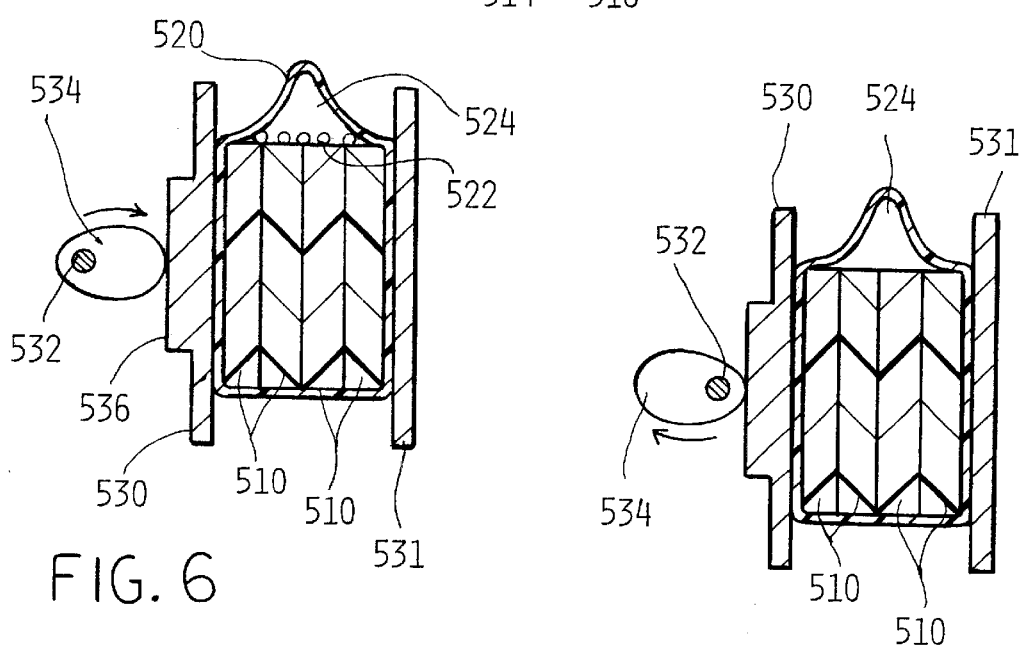
FIG. 6
FIG. 7

METHOD FOR DISTRIBUTING ELECTROLYTE IN BATTERIES

FIELD OF THE INVENTION

The present invention relates to methods of preparing electrochemical cells.

BACKGROUND OF THE INVENTION

A polymer electrochemical cell, such as a rechargeable lithium ion battery, commonly constructed by means of the lamination of electrode and separate cell elements which are individually prepared. Each of the electrodes and the electrolyte film/separator is formed, for example, by coating, extrusion, or otherwise, from compositions including binder materials and a plasticizer.

In the construction of a standard lithium-ion cell, for example, an anodic current collector may be positioned adjacent an anode (negative electrode) film, or sandwiched between two separate anode films, to form the negative electrode.

Similarly, a cathodic current collector may be positioned adjacent a cathode (positive electrode) film, or sandwiched between two separate cathode films, to form the positive electrode.

A separator is positioned between the negative electrode and the positive electrode. The anode, separator, and cathode structures are then laminated to produce a unitary flexible cell structure.

An extraction process is used to prepare the cell for activation with electrolyte. During processing of the cell, a large quantity of a homogeneously distributed plasticizer is present in the solid polymeric matrix. Prior to activation of the cell or battery, however, the plasticizer is removed. This is generally accomplished using an extracting solvent such as diethyl ether or hexane, or the application of a vacuum, which selectively extracts the plasticizer without significantly affecting the polymer matrix. This produces a "dry" cell, which does not include any electrolyte solvent or salt. An electrolyte solvent and electrolyte salt solution is imbibed into the "dry" cell structure to yield a functional electrochemical cell system.

A lithium ion battery typically comprises several cells in which the current from each of the cells is accumulated by a conventional current collector, so that the total current generated by the battery is roughly the sum of the current generated from each of the individual cells in the battery. In lithium ion batteries it is common to stack separate cells to create the battery.

Lithium ion electrochemical cells may be of the traditional "sandwich" type with a cathode, a separator, and an anode sandwiched together. However, there is a trend to develop "bi-cells". Bi-cells include a central electrode (either cathode or anode), with the opposing electrode present on each side of the central electrode, separated by membrane or separator-layers.

The activating materials are generally electrolyte solutions added to fill up the porous structure created upon the removal of the plasticizers. Since activation of the cells is typically an expensive and time consuming step, and since a battery's capacity is dependent on the activation step, there is a need for improvement.

SUMMARY OF THE INVENTION

The invention is directed to a method for distributing electrolyte within a laminate structure during activation to form a battery. The laminate structure is placed in a container, then an electrolyte solution comprising an electrolyte solvent and an inorganic salt is placed in the container. In one aspect, compression and decompression cycles are applied to the container in any desired order. The compression and decompression facilitate the distribution of electrolyte over all surfaces of the laminate structure. In one embodiment, the compression cycle is applied followed by decompression. In another embodiment, the decompression cycle is applied followed by compression.

A further feature of the invention is to apply the compression cycle and the decompression cycle more than once. This provides for improvement of wetting the laminate structures over single compression and decompression cycles.

A further feature of the invention is to use flexible containers for holding the laminate structures during activation. The flexible containers allow for the transmission of external forces into the laminate structure.

In one embodiment of the invention, the decompression cycle is accomplished by subjecting the container to an external vacuum, the compression cycle is accomplished by releasing the vacuum. Preferably the steps are repeated.

In another embodiment of the invention, the compression cycle is accomplished by subjecting the container to an external pressure, the decompression cycle is accomplished by releasing the pressure. Preferably the steps are repeated.

In another embodiment of the invention, the compression cycle is accomplished by mechanically applying a force to squeeze the container, the decompression cycle is accomplished by releasing the mechanically applied force Preferably the steps are repeated.

Another embodiment is the use of ultrasound for the compression and decompression cycles. The laminate structures are placed in a container and electrolyte solution is added. The container is then subjected to ultrasonic waves.

BRIEF DESCRIPTION OF THE DRAWINGS

These and other features, aspects, and advantages of the present invention will become apparent with reference to the following description, appended claims, and accompanying drawings where:

FIG. 4 is a diagram of a general system including a chamber into which a plurality of bi-cell stacks are placed for treatment to distribute the electrolyte. The general system and chamber are adaptable for use in vacuum treatment and pressurization treatment alternatives.

FIG. 5 is a cross-sectional view of a bi-cell stack in a condition under vacuum treatment illustrating the effect of vacuum applied to the chamber of FIG. 4 used as vacuum vessel 501, whereby a vacuum occurs external of the container 520.

FIG. 6 is a diagram of the container containing a bi-cell stack under positive pressure applied by flow of mechanical compression or squeezing.

FIG. 7 is a diagram of the container of FIG. 6 containing the bi-cell stack in a condition after the force is released.

DETAILED DESCRIPTION OF THE PREFERRED EMBODIMENTS

Figure 1:
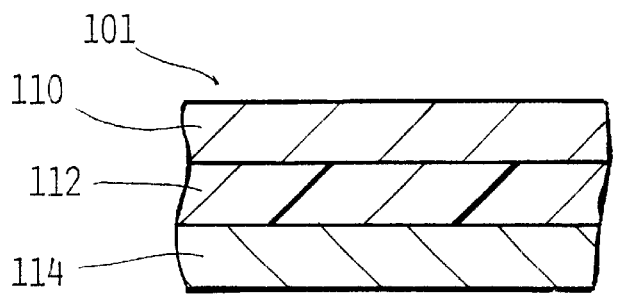
FIG. 1 shows a prior art cross-sectional view of an electrochemical cell, including anode, cathode and separator.

The invention is directed to a method of achieving good electrolyte distribution in an electrochemical cell. Although the method of the present invention is most useful for cells having many layers, such as a bi-cell (FIG. 2), it is equally applicable to cells having fewer layers (FIG. 1). The following description of the structure of cells and particularly bi-cells is useful to understanding the importance of achieving good electrolyte distribution.

A traditional lithium ion electrochemical cell, shown in FIG. 1, has a positive electrode 110, a negative electrode 114, and a separator 112, generally a polymeric electrolyte film, therebetween. An ion-conducting electrolyte provides ion transfer from one electrode to the other, and commonly permeates the porous structure of each of the electrodes and the separator. There is a trend to develop "bi-cells" in which two anodes or two cathodes are present, surrounding a single opposite electrode.

These structures are known in the art and are described in U.S. Pat. Nos. 5,460,904 and 5,587,253 (Gozdz et al.), each of which is incorporated herein by reference in its entirety. See also U.S. Pat. No. 5,902,697, owned by the Assignee of the present invention, and incorporated herein by reference. Basic features of bi-cells pertinent to illustrate the present invention are described with reference to FIG 2.

Figure 2:
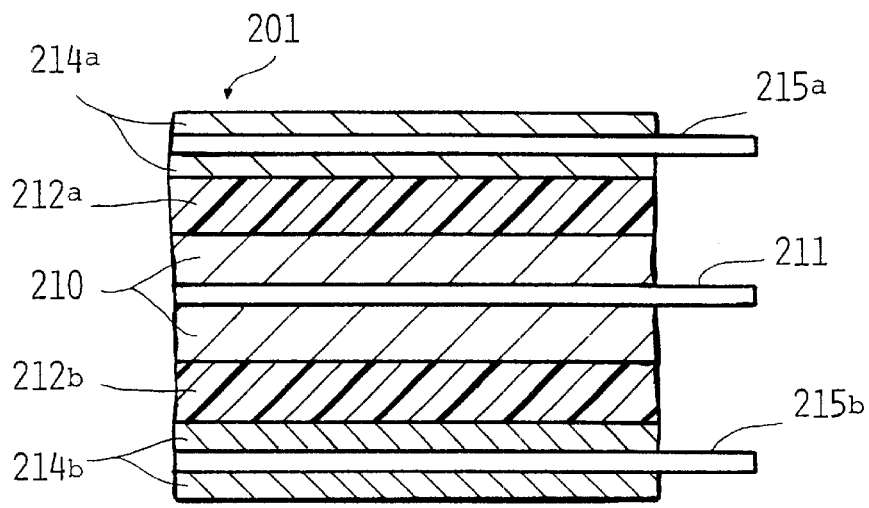
FIG. 2 shows a prior art cross-sectional view of a bi-cell, including first and second electrodes, first and second separators, and central counter electrode.

A bi-cell 201, such as that shown in FIG. 2, includes, sequentially, a first counter electrode 214a having a first positioned current collector 215a, a first separator 212a, a central electrode 210 having a central current collector 211, a second separator 212b, and a second counter electrode 214b having a second positioned current collector 215b. An electrode tab (not shown) connects the central electrode elements to the exterior of the container. A similar counter electrode tab (not shown) connects the counter electrode elements to the exterior of the container.

In the construction of a lithium ion bi-cell battery such as that shown in cross section in the FIG. 2, a binder material provides a polymeric matrix for each of the counter electrodes, the separator membranes, and the central electrode. Although separator membranes are typically polymeric materials, the separator membrane is not limited to these. Separators can include woven and non-woven mats of glass or other fibers, which maintain the electrodes spaced apart and function with suitable electrolytes which allow for ion transport therebetween.

Polyvinylidene difluoride (PVdF) and hexafluoropropylene (HFP) copolymers are common binder materials, and are the binder materials which are generally useful in the subject invention. The copolymer generally comprises about 75 to 92% (by weight) of the PVdF, and about 8 to 25% HFP. Preferably, the copolymer comprises about 85 to 90% of the PVdF, and about 10 to 15% HFP. One especially preferred, commercially available copolymer material is KYNAR: Flex 2801 (Elf Atochem North America, Philadelphia, Pa.), which provides an 88:12 ratio of PVd:HFP. Inorganic filler adjuncts, such as fumed alumina or fumed silica, are added desired to provide structural stability to the binder and provide a film having desirable qualities.

A separator may be a commercially available separator made of glass fiber, porous polypropylene or porous polyethylene. Such separators include Type A/E glass fiber filters (Gelman Sciences, Ann Arbor, Mich.), and Celgard (Hoechst-Celanese Corp., N.Y., N.Y.). In one embodiment, the separator is a sheet of a mesh material such as polypropylene, polyethylene, or a copolymer of polypropylene or polyethylene, desirably a copolymer of polypropylene and polyethylene. In one embodiment, such mesh is cast with a copolymer of PVdF polyvinylidene difluoride): HFP (hexafluoropropylene). This forms the polymer mesh positioned in the separator, with the PVdF:HFP filling at least some of the holes. In another embodiment, the separator is a solid polymeric matrix, such as the polymeric membrane described above. Preferred polymeric electrolyte membranes are produced using a casting process in which a carrier liquid is removed to form a flexible sheet. An alternate preferred method produces polymeric electrolyte membrane by extrusion processes. Suitable polymeric electrolyte membranes provide a porous structure, permeated with a plasticizer, upon casting or curing.

A plasticizer is an organic solvent that facilitates the formation of porous polymeric structures. Appropriate plasticizers have high boiling points, typically in the range from about 150° to about 350° C. The plasticizer or plasticizer system must be compatible with the components of the electrochemical cell, it must be processable within design parameters, and it must exhibit low polymer solubility. The plasticizer may be subsequently removed, for example, by extraction, prior to the formation of the activated cell.

A variety of plasticizers for processing or activation of the bi-cell stack are known in the art. Such materials include, for example: ethylene carbonate (EC); propylene carbonate (PC); butylene carbonate (BC); vinlyene carbonate (VC); dimethyl adipate (DMA); diethyl carbonate (DEC); dipropylene carbonate (DPC); dibutyl carbonate (DBC); acetates; diesters; oxalates such as dimethyl, succinate, adipate, suberate, and sebacate oxalates; glymes; and low molecular weight polymers such as polycarbonates, polyacrylates, polyesters or polysiloxanes. Other plasticizers include dimethyl, diethyl, dipropyl, dibutyl, and dioctyl adipate. Mixtures of such plasticizers can also be used.

Each of the anodic and cathodic electrodes are formed by similar processes, but include specific anode-active or cathode-active materials in the polymeric binder. That is, a solid polymeric matrix provides part of the structure of the electrode. The polymeric matrix is formed using solid-polymer-forming material such described above.

An electrode film forming material includes a binder, appropriate electrode. active (anode-active or cathode-active) materials, a plasticizing solvent and, if appropriate, a casting solvent. Upon removal of casting solvent from the electrode film forming material, an electrode film is formed. Suitable electrode films provide a flexible sheet having a porous electrode structure, permeated with a plasticizer, after solvent casting.

The negative electrode is the anode during discharge. Typical anode active ma rials are well known in the art, and include, by way of example, intercalation based anodes such as those using carbon or tungsten oxides, and the like. Anode active materials which are appropriate for use within the subject method include lithium intercalation anodes employing carbon materials such as graphite, cokes, mesocarbons, and the like. The anode may also include an electron conducting material such as carbon black. Solid alkali metal anodes, including lithium metal anodes, are also known, but are generally not preferred.

The anode commonly includes a current collector laminated with the negative electrode material. Materials suitable for anodic current collectors are known in the art, and are usually comprised of an electron conductive material such as metal or alloys. Typical materials include nickel, iron, stainless steel, or copper. Preferably a copper foil sheet, open mesh, expanded metal, woven or non-woven or knitted wire fabric or grid is used. Each current collector is also connected to a current collector tab, which extends from the edge of the current collector. In batteries comprising multiple electrochemical cells, the anode tabs are preferably electrically connected together (such as by welding) and connected to a nickel or copper lead. External loads can be electrically connected to the leads. Current collectors and tabs are described in U.S. Pat. Nos. 4,925,752; 5,011,501; and 5,326,653; each of which is incorporated herein. An adhesion promoter can be used to facilitate bonding between the anode material and the anodic current collector.

The positive electrode is the cathode during discharge. Many cathode active materials are known in the art, and include lithium containing compounds or insertion; compounds. For lithium ion applications, these are normally characterized as containing all the lithium for the cell. Preferred cathodic materials de-intercalate, or release lithium when used in an electrochemical cell with a suitable counter electrode. Typical cathodic materials include, by way of example, lithium metal compound chalcogenides, transition metal oxides, sulfides, and selenides. Such materials i dude oxides of cobalt, manganese, and vanadium; sulfides of titanium, molybdenum m and niobium; the various chromium oxides; copper oxides; and lithiated oxides of cobalt, manganese and nickel; and the like. Cathodic materials include $Li_xMn_2O_4$, $LiCoO_2$, $LiNiO_2$, $LiCo_{1-y}Ni_yO_2$, $0 \leq y \leq 1$, and the like; and more recent cathode materials include lithium metal phosphates, and additives for improved performance. See, for example, U.S. Pat. Nos. 5,871,866; 5,738,691; 5,429,890 and 5,869,207, all assigned to the Assignee of the present invention and incorporated herein by reference.

The cathodic material is mixed with an electroconductive material such as graphite, powdered carbon, powdered nickel, metal particles, conductive polymer and the like. The cathode is preferably produced using a polymeric binder to form the positive electrode film; i.e., a solid polymeric matrix provides part of the structure of the cathode. As with the polymeric electrolyte film/separator, the polymer binder is formed using both a solid-polymer-forming material and a plasticizer compound.

A positive electrode generally includes a current collector laminated with a positive electrode active film material. Materials suitable for cathodic current collectors are known in the art, and are typically comprised of an electron conductive materials such as metals or alloys. The cathode current collector is typically of aluminum, stainless steel, and such foils having a protective conductive coating foil. Preferably the cathode current collector is an aluminum foil sheet, open mesh, expanded metal, woven or non-woven or knitted wire fabric or grid. Each current collector is also connected to a current collector tab which extends from the edge of the current collector. In batteries comprising multiple electrochemical cells, the cathode tabs are preferably welded together and connected to a lead. External loads can be electrically connected to the leads. An adhesion promoter can be used to facilitate bonding between the cathode material and the cathodic current collector.

A "dry" cell is prepared by assembling an anode, a separator membrane and a cathode, and extracting plasticizer from each of the layers. Although each of the electrodes and the separator can be individually extracted, it is generally more convenient to laminate or assemble the appropriate layers with the plasticizer intact and extract the plasticizer from the bi-cell stack as a unit. Methods for bi-cell$_1$ stack preparation and extraction are described in U.S. Pat. No. 5,456,000, which is incorporated herein by reference.

The extracted bi-cell stack is activated by the addition of a solvent/electrolyte salt solution. The electrolyte solvent is a solvent included in the electrolyte solution for the purpose of solubilizing alkali salts during operation of the cell. The electrolyte solvent can be any compatible, relatively non-volatile, aprotic, relatively polar solvent. Preferably these materials have boiling points greater than about 85° C. to simplify manufacture and increase the operation range and shelf life of the battery. Typical examples of solvents are dimethyl carbonate (DMC), diethyl carbonate (DEC), propylene carbonate (PC), ethylene carbonate (EC), methyl ethyl carbonate (MEC), gamma-butyrolactone, triglyme, tetraglyme, dimethyl sulfoside, dioxolane, sulfolane, dimethyl glutarate, acetates and the like, and mixtures of such materials. Among the acetates that are preferred, but not limited to, are isopropyl acetate, propyl acetate, butyl acetate, isobutyl acetate, propylene glycol diacetate, ethylen glycol diacetate, 2-ethoxyethylacetate, and dimethyl glutarate.

Electrolyte salts are those inorganic salts which are suitable for use in a non-aqueous electrolyte. Particularly useful are alkali salts wherein the cation of the salt is alkali selected from the group consisting of lithium, sodium, potassium, rubidium, silver, and cesium, and which are suitable for use in the solvent-containing electrolyte and in the composite electrodes of an electrolyte cell.

A variety of electrolyte salts are known in the art. For example, $LiPF_6$, $LiSCN$, $LiAsF_6$, $LiClO_4$, $LiN(CF_3SO_2)_6$, $LiBF_4$, $LiCF_3SO_3$, $LiSbF_6$, $NaSCN$, and the like. The electrolyte salt typically comprises from about 5 to about 25 weight percent of the inorganic ion salt based on the total weight of the electrolyte. Preferably, the salt is present in the electrolyte solution from about 10 to 20 weight percent. The weight percent of the salt will vary with the type of salt and upon the specific electrolyte solvent employed, as known in the art.

The laminated bi-cell stack is generally placed into a moisture impermeable container, and electrically connected to electrode tabs, prior to activation by the electrolyte solution. Because many electrolyte salts are sensitive to moisture; or other chemical compounds, the activation of the cell preferably takes place in an inert, moisture-free atmosphere, such as under an argon atmosphere or in a dry room.

The following descriptions demonstrate methods of making bi-cells for use in the bi-cell stacks when distributing electrolyte.

Cathode Current Collector

An aluminum grid used for the anode current collector is a sheet of expanded aluminum metal of about 2.5 g/m². It is available under the designation 2A105-077 (flattened and annealed) (Delker, Branford, Conn.) or Exmet (Naugatuck, Conn.).

The surface of the aluminum grid is prepared by etching the grid in a series of solutions. Specifically, the aluminum grid is placed into an acetone bath for 5 minutes is then rinsed in water for 1 to 2 minutes. The aluminum grid is then dipped in an etch bath solution comprising 56 grams of potassium hydroxide pellets which have been dissolved in 1 L of methanol. The aluminum grid is removed from the etched solution after 8 minutes, and placed in a fresh water bath for 8 minutes, followed an acetone bath for 3 minutes.

An adhesion promoter layer is prepared as a dispersed colloidal solution. grid coating is formed by adding 100 parts (by weight) ethanol, 100 parts Morton Adcote 50C12, and 5 parts SUPER-PTM (M.M.M. Carbon, Willebrock, Belgium) into a ball mix jar, and mixed for one hour. The dispersed colloidal solution diluted in 100 parts ethanol and spray coated onto the etched aluminum grid.

In an alternative, the cathode current collector is fabricated as above, substituting either POLAQUA™ or PAA (polyacrylic acid) for the dispersed colloidal promoter. POLAQUA™ is a lamination adhesive. It is available from HAMTRONICS (Northvale, J.J.)

Cathode Structure

A polymer/cathode mixture is prepared by mixing 10 parts by weight of K RT Flex 2801 (a copolymer of PVdF and HFP) (Elf Atochem, Philadelphia, Pa.), 65 parts by weight 025C ($Li_xMn_2O_4$) (Kerr-McGee), and 5 parts of SUPER PT carbon black. The material is mixed for 24 hours in a ball milling jar.

To the dry, powdery cathode active mix is added 20 parts of dibutyl phthalate (DBP). The wetted material is mixed under high shear for ten to thirty minutes until a homogeneous mixture is formed. A blender maintained at a temperature of 130° C. is appropriate for the mixing.

Two cathode sheets, each having a thickness of 125 μm, are formed by hot pressing at 130° C. for 30 seconds on an appropriate substrate. A current collector, prepared as described immediately above, is placed on the upper surface of the first cathode sheet. A second cathode sheet is then placed on the upper surface of the current collector. Pressure is applied to the resultant three-layer structure to provide good contact between the layers, and the structure is hot-pressed at 130° C. for 20, 10 or 5 seconds to form a cathode structure. The final total thickness, including the cathode film and the aluminum grid, is approximately 60 to 500 μm.

Anode Current Collector

A copper grid used for the anode current collector is a sheet of expanded copper metal about 50 μm thick. It is available under the designation 2Cu5-155 (flattened and annealed) (Delker, Branford, Conn.).

The surface of the copper grid is prepared by etching the grid in a series of solutions. Specifically, the copper grid is placed into an acetone bath for 5 minutes. It is then rinsed in water for 1 to 2 minutes. The copper grid is then dipped in an etch bath solution comprising 1 molar nitric acid (70 ml 70% nitric acid and 1 L of water) copper grid is removed from the etch solution after 5 minutes and placed in a fresh water bath for 8 minutes, followed by an acetone bath for 3 minutes.

An adhesion promoter layer is prepared as described above, and spray coated onto the etched copper grid.

In an alternative, the anode current collector is fabricated as above, substituting either POLAQUA™ or PAA (polyacrylic acid) for the dispersed colloid promoter.

Anode Structure

A polymer mixture is prepared by placing 12 parts of PVdF:HFP copolymer (KYNAR™ Flex 2801) with 60 parts of BG34 (Superior Graphite, Bloomingdale, Ill.) into a ball mil jar and mixing for 24 hours. This produces a dry, powdery mix in which the particles are well-mixed and of small size.

To the dry, powdery mix is added 30 parts of dimethyl adipate (DMA). The wetted material is mixed under elevated temperature (130° C.) and high shear conditions for ten to thirty minutes or more, until a homogeneous mixture is formed.

An anode sheet is formed by hot pressing the anode material at 130° C. for 30 seconds on an appropriate substrate. An anode current collector, as described immediately above, is placed on the upper surface of the anode sheet, and pressure is applied to the resultant structure. To provide good contact between the layers, it is laminated at 120° C. with a hot roll laminator or hot press to form an anode structure. The final total thickness, including the anode film and the copper grid, is a approximately 130 μm.

Separator

Twenty (20) parts of treated fumed silica and 30 parts of KYNAR™ Flex 2801 are placed into a ball mill jar and mixed for 24 hours. This produces a dry, powdery mix in which the particles are well-mixed.

To the dry, powdery mix is added 55 parts of dibutyl phthalate (DBP). The wetted material is mixed under low shear for five to ten minutes, until a homogeneous mixture is formed. The resultant mixture is hot-pressed at 130° C. for 30 seconds to form a strong, clear film having a thickness of about 1.25 mil.

Preparation of Electrochemical Bi-Cell

A solid electrochemical cell is formed by laminating a first anode of the aforesaid anode structure adjacent a first polymeric separator film as described above, and laminating a second anode adjacent a second polymeric separator film. A cathode of the aforesaid cathode structure is positioned between the two polymeric separate films of the two anode structures, and the unit is laminated together.

The layers are positioned as shown in FIG. 2. The layers in sequence a e as follows: first anode structure, 214a; first separator 212a; central cathode structure 210; second separator 212b; and second anode structure 214b. The layers are heated under pressure to form a bi-cell. The wt:wt ratio of cathode to anode in the completed bi-cell is 2.5:1.

Bi-Cell Stack Preparation

The electrochemical bi-cells are immersed in a bath of methanol or diethyl ether or in a series of methanol or ether baths to remove the plasticizer. Preferable the methanol or ether bath(s) provide at least 30 minutes of contact with an excess of methanol or ether.

The extracted bi-cells are vacuum dried overnight at 40° C., and stored under dry box or anhydrous conditions until the bi-cells are to be activated using an electrolyte solution, and the improved electrolyte imbibing and distribution methods of the invention.

The extracted and dried bi-cells are removed under an inert atmosphere of argon or nitrogen. The bi-cells are stacked and placed into a preformed container, with one container edge already sealed. The container is of proper dimensions and has an expansion pocket. The container is sealed on two sides using present art sealing technology and a third side is sealed across the tabs. One edge of the container is left open for introduction of the electrolyte. Typically the edge left open is e edge opposite the electrode tabs. In one aspect, the container is a preferred flexible container 520. Various moisture and/or air impermeable battery packaging materials and designs for use as containers are described in U.S. Pat. Nos. 4,997,732, 5,445,856, and 6,042,966, incorporated herein by reference in their entirety. Preferred are flexible metal foil and polymeric laminated sheets with a non-electrically conductive polymeric, heat sealable layer internal of a metal foil, to inhibit or prevent transport of moisture (water) and air therethrough. The stacks comprise a minimum of one bi-cell and up to typically 9 bi-cells, but stacks containing more than 9 bi-cells are contemplated by this invention. An electrolyte solvent is prepared by combining 267 parts of ethylene carbonate and 133 parts of dimethyl carbonate. To the electrolyte solvent is added 60 parts of $LiPF_6$ to form an electrolyte solvent solution. The containers are oriented such that the open edge is at the tops receive the electrolyte. The electrolyte solvent solution is added to the bi-cell container under an inert atmosphere. An inert atmosphere of argon or nitrogen is preferred. The flexible containers are sealed on two sides using present art technology. The seal across the electrode tabs requires more stringent conditions for sealing than the other edges of the packages. Normally the tab seal requires higher temperatures, higher pressures, and longer dwell times than sealing package material to package material. The tab sealing requires the most attention. The sealant layer of the packaging must form a strong seal to the aluminum and copper metals. Both chemical and physical methods can be used to facilitate the sealing of the tabs. The aluminum in the past proved to be the most difficult to seal. The seal was strengthened sufficiently by physically roughening the surface of the tab to remove the high luster of the metal. The tab material is easily obtained from producer with a "brushed" surface. When the cells are placed into the cell pocket, the aluminum and copper tabs extend some distance outside the seal area and of a length sufficiently beyond the seal to allow for the attachment to other circuitry or devices. Chemicals such as lamination adhesives, such as POLAQUA, can be coated onto the tabs to improve the seal strength. However, coating tab material during production was not pursued. The tab seal was performed at 175° C. and 15 p.s.i.g. with a dwell time of 3 seconds. All other seals were formed at 130° C. and 15 p.s.i.g. with a dwell time of 3 seconds.

In an alternative, with sachet packaging there is a fold in place of a seal. Typically, the tab seal is opposite the open edge.

Care must be taken such that the unsealed edge is not contaminated with the electrolyte solvent solution so as not to compromise seal strength. Typically a thin, inert plastic tube is inserted into the container to a sufficient depth to avoid splashing the electrolyte solvent solution onto the open edge during addition.

Following the addition of electrolyte, a vacuum is drawn to remove any residual gas and the container is sealed using heat, pressure, and dwell time. At the same time an expansion pocket is formed to accept any vapor or gas generated during the activation.

In an alternative, electrolyte solution can be added in stages before sealing the container.

At this stage in the method of preparing bi-cells, the present invention facilitates sod electrolyte distribution. Various factors influence the performance of electrochemical cells, including the morphology of the separator. Although porous and non-porous polymeric materials are known for use as a separator or separator membrane enhancement of conductivity has been demonstrated by the use of porous polymeric binders and matrices. These porous structures facilitate electrolyte distribution for enhanced performance. However, current methods of filling the cells tend to produce cells that are prone to having regions in the laminate (separate and other layers) of void spaces or pore spaces without any electrolyte solvent. Cells were examined by physically pulling the cells apart to study the distribution of electrolyte; solution produced using prior art methods. Disassembly of bi-cells along the plane. The separator revealed the separator had significant numbers, and sizes of areas devoid of electrolyte solvent, or dry spots. Areas devoid of electrolyte solvent are regions of very low activity and affect the overall performance safety, and cycle life of the cell.

The invention provides for the treatment of the bi-cells in a container having electrolyte. The treatment of bi-cells is by a variety of physical means including agitation; force directed toward the container and cell, such as mechanical or pressure compression; and vacuum reduced pressure external of the container and cell. In on aspect, the bi-cells in the container with electrolyte, are subjected to compression and decompression cycles. Experiments were performed to improve the imbibing of electrolyte solution and the distribution of electrolyte solution within the cells. Using various physical means, the wetting of the external and particularly internal surfaces between bi-cells was improved for enhanced imbibement of electrolyte solution.

The following procedures and examples are offered for purposes of demonstration, and not by way of limitation.

PROCEDURE 1

Figure 3:
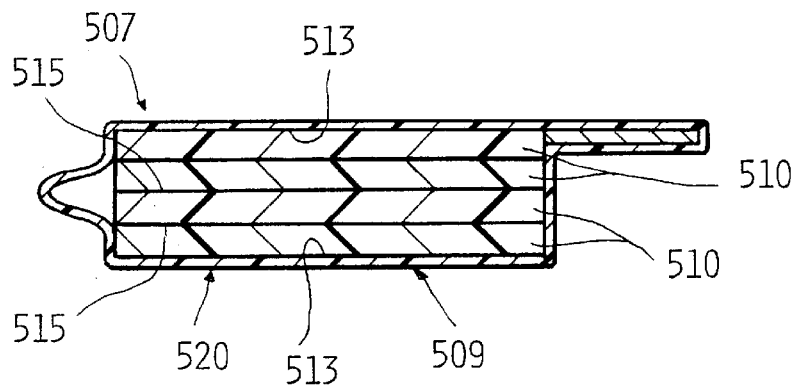
FIG. 3 is a cross-sectional view of a stack of four bi-cells 510 sealed in a container, and before being subjected to treatment for distributing the electrolyte.

FIG. 3 shows an assembly 507 comprising a stack 509 of four bi-cells 510 housed in a moisture-impermeable container 520. The electrolyte solution is added to the container 520. A vacuum is then drawn on the interior of the container 520 to remove excess air and vapor from within the container 520. The container 520 is then sealed.

The assembly 507, comprising the sealed container 520 housing the bi-cell stack 509, is next subject to treatment to distribute the electrolyte. In one aspect, the treatment is accomplished in a vacuum chamber 501, FIG. 4. A vacuum is hen drawn on the chamber and external to the container 520. The vacuum is then released. The cycle of drawing a vacuum and releasing it is repeated. A vacuum can be drawn from a value of about −2 in. Hg (−6700 Pa) to about −30 in. Hg (−102,000 Pa), with a preferred range from about −11 in. Hg (−40,000 Pa), to about −20 in. Hg (−70,000 Pa). The term vacuum refers to the pressure levels below ambient pressure and are therefore expressed in terms of negative values. Therefore, a larger negative value means a stronger vacuum has been drawn.

Experiments were performed at −15 in. Hg (−51,000 Pa) and at −25 in. Hg (−85,000 Pa). There was good dispersion of electrolyte solution at both vacuums; however, at the more severe vacuum (−25 in. Hg −85,000 Pa), the process may be considered abusive. This process of drawing and releasing the vacuum stresses the container containing the electrochemical cell and the electrolyte solution. The vacuum was drawn for a preferred time of 1.5 seconds, and released for a preferred time of 1.5 seconds. In the process, the bi-cells move relative to one another. This motion allows for the electrolyte solution to better cover all the surfaces of the bi-cells, including surfaces between bi-cells. The electrolyte solution is then imbibed into the bi-cells. Preferred times for drawing the vacuum are from about 0.5 seconds to about 5.0 seconds and for the release stage are from about 0.5 seconds to about 5.0 seconds. A preferred number of cycles are between 1 and about 20, with a more preferred number of cycles in the range of about 3 to 10, and a most preferred number of cycles of about 5.

Referring back to FIG. 3, the edgewise view of assembly 507 comprising an individual container 520 housing a bi-cell stack 509, without the application a vacuum, shows the four bi-cells 510 stacked one upon another within the container 520. The bi-cell stack 509 comprises external surfaces 513 contacting the container 520 and interior surfaces 515 between neighboring bi-cells 510. When a vacuum is drawn on the vacuum vessel 501, FIG. 4, air is evacuated from the vessel 501 a vacuum pump 503. The pressure within the vessel 501 external to the container 52 ) of assembly 507 is reduced to below the initial internal pressure of the container 52 ). The flexible container 520 expands into a swollen shape as shown in FIG. 5. Gaps 514 are created between the interior surfaces 515 between individual bi-cells 510. Electrolyte solution fills the gaps 514 and wets the surfaces 515 between the individual bi-cells 5 10. In addition, the flexing of the container 520 produces gaps 516 between the external surfaces 513 and the container 520. Electrolyte solution fills these gaps 516 and wets the external surfaces 513 of the bi-cells 510. This produces a more rapid and even distribution of electrolyte around the bi-cells 510, which is subsequently more rapidly and evenly imbibed into the bi-cells 510.

The testing was performed under a variety of conditions and additional parameters were studied. The parameters studied include bi-cell stack orientation, rotating the packages, flipping the bi-cell packages between cycles, and heating the packages to temperatures of about 50° C. In one alternative, the packages were heated to at out 45° C. for about 30 minutes after vacuum cycling.

EXAMPLE 1

Bi-cell stacks containing 6 bi-cells per stack were extracted from storage under an inert atmosphere. The stacks were placed into packages and three sides were 'sealed, including the tab side. Each package was dosed with 5.97 grams of electrolyte and then the fourth side was sealed. The tab side was sealed at 175° C. and 15 p.s.i.g (103,400 Pa) for 3 seconds. The remaining three sides were sealed at 130° C. and 15 p.s.i.g. (103,400 Pa) for 3 seconds.

The packages were suspended tabs down for 10 minutes, repositioned to print down for 20 minutes, then repositioned to print up for 20 minutes. Then the packages were placed in a vacuum oven and a vacuum was drawn to −25 in. Hg (−85,000 Pa for 5 minutes. The packages were then placed print down and a vacuum was drawn to −25 in. Hg (−85,000 Pa) for 5 minutes. Finally, the packages were flipped print up and a vacuum was drawn to −25 in. Hg (−85,000 PA) for 5 minutes. The bi-cells were disassembled along the separators 212a, b, and the separators 212 a, b were examined for dry spots. Control bi-cell packages were processed in the same manner except without the vacuum steps. Comparison with control bi-cell packages resealed either complete elimination or significant reduction in dry spot size and numbers.

EXAMPLE 2

Bi-cell stacks were prepared as in Example 1. Three bi-cell packages were cycled 5 times while positioned on edge between ambient pressure and −25 in. (−85,000 Pa Hg and held at −25 in. Hg (−85,000 Pa) for 1 minute. Three bi-cell packages W re cycled 5 times, while positioned on edge, between ambient pressure and −15 in. −51,000 Pa) Hg and held at −15 in. Hg (−51,000 Pa) for 1 minute. Three bi-cell packages were cycled 5 times, while positioned print side up, between ambient pressure and −15 in. Hg (−51,000 Pa) and held at −15 in. Hg (−51,000 Pa) for 1 minute. Two bi-cell packages were cycled 10 times, while positioned on edge between ambient pre sure and −25 in. (−85,000 Pa) Hg as rapidly as possible. Two bi-cell packages were cycled 5 times, while positioned on edge, between ambient pressure and −25 in. Hg (−85,000 Pa) as rapidly as possible. Comparison with control bi-cell packages resealed either a complete elimination or significant reduction in dry spot size and numbers.

EXAMPLE 3

Bi-cell stacks were prepared as in Example 1. Three bi-cell packages were cycled. once, while positioned on edge, between ambient pressure and −25 in. (−85,000 Pa Hg and held at −25 in. Hg (−85,000 Pa) for 30 seconds. Three bi-cell packages we re cycled once, while positioned on edge, between ambient pressure and 15 in. Hg (−1,000 Pa), and held at −15 in. Hg (−51,000 Pa) for 30 seconds. Two bi-cell package, were cycled once while positioned print side up between ambient pressure and −15 in Hg (−51,000 Pa), and held at −15 in. Hg (−51,000 Pa) for 30 seconds. Comparison with the control bi-cell packages revealed very little differences.

PROCEDURE 2

Another method for distributing electrolytes is to apply a positive pressure external of the container. Referring back to FIG. 3, assembly 507 comprises the bi-cell stack 509 housed in a moisture-impermeable container 520. The electrolyte solution is included in the container 520. A vacuum is then drawn on the interior of the container 520 to remove excess air and vapor from the container. The container 520 is then sealed. The container 520 is placed in a pressure vessel where pressure is applied external of the container. The pressure vessel may be of the same general arrangement as FIG. 4, where pump 503 pumps a gas into chamber 501 which is now used as a pressure vessel. A positive pressure is applied to the chamber 501 and external of the container for a preferred time of about 1.5 seconds, and released for preferred time of about 1.5 seconds. The process of applying a positive pressure an releasing is repeated for a number of cycles in the range of 1 to about 20, with a preferred range being from about 3 to about 10. Preferred time for applying the positive pre sure is from about 0.5 seconds to about 5 seconds, with more preferred times from about 1 second to about 3 seconds. Preferred positive pressures range from about 100 kilopascals to about 2000 kilopascals, with more preferred pressures in the range of about 100 kilopascals to about 500 kilopascals.

PROCEDURE 3

Another method for the application of a positive pressure or force is to use mechanical means to squeeze the container 520 containing the bi-cell stack and electrolyte solution, as shown in FIG. 6. The container 520 is placed between two plates 530, 31 and a force is applied to compress the container 520. The bi-cells 510 are porous ad! compressible and are compressed when squeezed between the plates 530, 531. A force is applied by operating a motor (not shown) which turns a shaft 532. The rate of the shaft's revolutions can be controlled by gearing (not shown). A cam 534 is attached to the shaft 532, and presses against a cam face 536 on the plate 530. The can 534 as it rotates imparts a force to the plate 530 and compresses the container. As the cam 534 continues to rotate, the force is released, FIG. 7. The cam face 53, is not limited to a flat portion of the plate, but may be a wheel attached to the plate, or other means of contacting the plate with the cam. The cam may also be of a more complex shape that imparts multiple compressions and decompressions with each revolution of the cam.

When the container is compressed, bubbles 522 appear around the edges of the bi-cells 510. This is evidence that residual air is squeezed out of the bi-cells 510 and upon release of the force, FIG. 7, or decompression, electrolyte solution is I awn into the bi-cells 510. Residual air is trapped in the expansion pocket 524. The mechanical squeezing is applied for about 1.5 seconds and released for about 1.5 seconds. The amount of force applied to squeeze the container is from about 5 pounds (22 Newtons) to several tons (22,000 Newtons) of force, with a preferred amount of force from about 10 pounds (44 Newtons) to 100 pounds (440 Newtons). The process of applying a mechanical force is repeated for a number of cycles in the range of 1 to about 20 cycles, with a preferred number of cycles of about 5. Preferred time for applying a mechanical force is from about 1 second to 3 seconds. The method of mechanical compression is not limited to a cam type mechanism. Those skilled in the art would be aware that any reciprocating mechanism would work, including but not limited to hydraulic methods, reciprocating wiper mechanisms, tappet mechanisms and the like.

PROCEDURE 4

Another method for distributing electrolytes is to use ultrasonic means. Following the placement of the bi-cell stack into a moisture-impermeable container, the electrolyte solution is added, a vacuum is drawn to remove excess air and vapor, and the container is sealed. The sealed container is placed in a chamber for the application ultrasonic waves. The terms "ultrasonic" and "ultrasound" as used herein describe the use of sound waves that have a frequency above 20,000 hertz. Ultrasound causes cavitation or the rapid expansion and compression of tiny bubbles in a fluid. The rate of expansion and compression is a function of the frequency of the applied sonic energy. Getting the ultra sound energy into a cell requires the cells to be in direct contact with an ultrasonic horn or transmitting medium such as a fluid, dense gas or gel. The cavitation of electrolyte within the cell should cause the electrolyte to distribute more evenly within and between bi-cells.

Without being held to any particular theory, the following explanation is thought to apply. The improved distribution of the electrolyte is believed to be due to mechanical effects that improve the capillary action for spreading the electrolyte to wet the surfaces between the bi-cells in the stack and over the bi-cells' outer surfaces, thereby providing better imbibement into the bi-cells. There are a combination of possible physical effects that help with the distribution of the electrolytes. There are the mechanical effects such as causing a slight separation of the bi-cells which increases the wetting of the surfaces by reducing the resistance to penetration of the region between the bi-cells. In addition to the mechanical processes promoting the covering of the bi-cell surfaces with the electrolyte solution, it is believed that lower pressures from the vacuum method reduce the surface tension of the electrolyte solution and improves its wetting capabilities. Here "wettability" is the tendency of the liquid to spread on the solid substrate. With the ultrasonic case, it is believed that there is some degassing happening to the liquid, and this in turn changes the surface tension to favorably wet the surface.

In summary, the invention provides an improved method for activating electrochemical cells by mechanical agitation and other means. The improvement in electrolyte distribution results in improved capacity of the cells. The improved method is as adaptable to large scale commercial production in an economical manner.

While the invention has been described in connection with several exemplary embodiments, it will be understood that many modifications will be apparent to those of ordinary skill in the art in light of the above disclosure. Reference to the claims should be made to determine the scope of the claimed invention.

What is claimed is:

1. A method for distributing electrolyte solution in a laminate structure comprising one or more electrochemical cells, the method comprising the steps of;
   providing a container containing the laminate structure and the electrolyte solution;
   applying a compression cycle including a compression step to the container, and
   applying a decompression cycle including a decompression step to the container.

2. The method of claim 1 wherein the compression step and the decompression step are performed repeatedly.

3. The method of claim 2 wherein the laminate stricture comprises, sequentially;
   an electrode;
   a separator element; and
   a counter electrode.

4. The method of claim 1 wherein the container is a flexible container.

5. The method of claim 4 wherein the container is sealed.

6. The method of claim 1 wherein the decompression step occurs first followed by a compression step.

7. The method of claim 5 wherein the decompression step is accomplished by applying a vacuum external of the container, whereby the pressure external of the container is less than the pressure within the container.

8. The method of claim 7 wherein the compression step is accomplished by releasing the vacuum.

9. The method of claim 4 wherein the container is made from a material selected from the group consisting of plastic, thin sheet metal, and metal foil.

10. The method of claim 1 wherein the laminate structure comprises, sequentially:
    a first electrode;
    a first separator element;
    a first counter electrode;
    a second separator element, and
    a second electrode.

11. The method of claim 1 wherein the compression step occurs first followed by the decompression step.

12. The method of claim 1 wherein the compression step is the application of a mechanical force directed substantially inward against the laminate structure.

13. The method of claim 12 wherein the decompression step is the release of said force.

14. The method of claim 1 wherein the application of compression and decompression steps is accomplished by ultrasound which provides rapid and successive compression and decompression cycles in the form of high frequency vibrations.

15. A method for distributing electrolyte solution in a laminate structure comprising sequentially a first electrode, a first separator element, a first counter electrode, a second separator element, and a second electrode, the method comprising the steps of:
    providing a sealed container containing the laminate structure and the electrolyte solution;
    placing said container in a chamber;
    drawing a vacuum in the chamber having said container therein;
    developing a pressure within the chamber having said container therein; and
    repeating the vacuum cycle step and the pressure step in a sequential manner.

16. A method for distributing electrolyte solution in a laminate structure comprising sequentially a first electrode, a first separator element, a first counter electrode, a second separator element, and a second electrode, the method comprising the steps of:
    providing a container containing the laminate structure and the electrolyte solution;

placing said container in a chamber;

pressurizing the chamber having said container therein;

releasing pressure within the chamber having said container therein; and repeating the pressurizing step and the release step in a sequential manner.

17. A method for distributing electrolyte solution in a laminate structure comprising sequentially a first electrode, a first separator element, a first counter electrode, a second separator element, and a second electrode, the method comprising the steps of:

providing a container containing the laminate structure and the electrolyte solution;

placing said container between two rigid plates;

applying a force to narrow the distance between the plates having said container therebetween;

releasing the force to increase the distance between the plates having said container therebetween; and repeating the force application step and the release step in a sequential manner.

18. A method for distributing electrolyte solution in a laminate structure comprising one or more electrochemical cells, the method comprising the steps of:

providing a container containing the laminate structure and the electrolyte solution; and subjecting the container to ultrasound.

* * * * *